(12) United States Patent
Hawlas et al.

(10) Patent No.: US 6,431,062 B1
(45) Date of Patent: Aug. 13, 2002

(54) BALING PRESS

(75) Inventors: Martin Hawlas, Harsewinkel; Ansgar Nonhoff, Wallerfangen; Egbert Scholz, Rheda-Wiedenbrueck, all of (DE)

(73) Assignee: Usines Claas France, St. Remy-Woippy (FR)

( * ) Notice: Subject to any disclaimer, the term of this patent is extended or adjusted under 35 U.S.C. 154(b) by 43 days.

(21) Appl. No.: 09/586,833

(22) Filed: Jun. 5, 2000

(30) Foreign Application Priority Data

Jun. 17, 1999 (DE) .......................................... 199 28 819

(51) Int. Cl.$^7$ .............................. B30B 1/00; B30B 5/00
(52) U.S. Cl. ................... 100/188 R; 100/250; 100/251
(58) Field of Search ................................ 100/218, 249, 100/250, 251, 188 R, 7

(56) References Cited

U.S. PATENT DOCUMENTS

| | | | | |
|---|---|---|---|---|
| 262,814 A | * | 8/1882 | Moore | 100/188 R |
| 2,138,604 A | * | 11/1938 | Jones | 100/188 R |
| 2,672,808 A | * | 3/1954 | Eldert | 100/188 R |
| 3,441,152 A | * | 4/1969 | Nickla et al. | 100/188 R |
| 3,708,953 A | * | 1/1973 | Aliotto | 100/218 |
| 3,722,722 A | * | 3/1973 | Blair | 29/253 |
| 3,799,373 A | * | 3/1974 | Randall | |
| 3,974,632 A | | 8/1976 | Van Der Lely | |
| 4,563,121 A | * | 1/1986 | Drews | 414/545 |
| 4,791,865 A | * | 12/1988 | Naat geboren | 414/545 |
| 4,924,667 A | * | 5/1990 | Wondergemm et al. | 100/188 R |
| 5,253,973 A | * | 10/1993 | Fretwell | 414/545 |
| 5,540,144 A | * | 7/1996 | Schrag et al. | 100/188 R |
| 6,089,003 A | * | 7/2000 | Frey | |

FOREIGN PATENT DOCUMENTS

DE  295 17 425 U1  2/1996

OTHER PUBLICATIONS

"CLAAS Quadrant 1150/1150 Roto Cut", 40/247415.8, Aug. 1996.
"CLAAS Quadrant 2000 and 2000 RC" 247535.0, Oct. 1998.

* cited by examiner

Primary Examiner—Stephen F. Gerrity
Assistant Examiner—Louis Huynh
(74) Attorney, Agent, or Firm—Michael J. Striker

(57) ABSTRACT

A baling press for agricultural harvesting products such as silage, hey, straw and the like, has a depositing device which is bringable into an operating position and transporting position and is operative for depositing pressed bales on a ground surface, the depositing device including a plurality of articulately connected elements, means forming a pressing passage having a housing and an opening, an element arranged to close the opening of the pressing passage in the transporting position, the element being foldable in by approximately 90° to a pressing direction for conversion of the depositing device from the operating position to the transporting position, and further comprising another element which is bringable as a drawer under a bottom of the pressing passage, an actuating device is provided for the depositing device and has a correspondingly operating adjusting members.

8 Claims, 3 Drawing Sheets

BALING PRESS

BACKGROUND OF THE INVENTION

The present invention relates to a baling press for agricultural harvesting products, such as silage, hay, straw or the like, with an improved depositing device for putting the pressed bails on a ground surface.

Known baling presses, mainly large baling presses, are provided with devices for finely putting the bails which are difficult to contain and are highly-compressed after leaving the pressing passage, onto the harvested surface. Such [bailing] baling presses are disclosed for example in the catalog of the company "CLAAS Quadrant 1150/1150 ROTO CUT" 40/247415.8 (08/96); "CLAAS Quadrant 2000 and 2000 RC" 247535.0 (10/98).

These devices in general are composed of several hingedly interconnected elements which are formed by a frame and transporting rollers are arranged transversely to the running direction of the bales leaving the pressing package. The devices which are also identified as end-, roller- or bale ramps are arranged in an extension of the pressing package and articulately connected by holding chains to the housing of the pressing passage. The ramp element which adjoins the pressing passage is connected with the pressing passage bottom so as to be turned in and out.

The ramps which are formed and arranged in this matter positively increase the total length of the harvesting machine in the working position, which must be reduced for the street transportation, for example by exchanging of the harvesting surfaces. For this purpose the ramp elements are turned by the operator of the agricultural complex relative to one another and brought into a transporting position in which the turned-in ramp elements are positioned approximately perpendicular to a plane of the pressing passage bottom and close the opening of the pressing passage. The turned-in and folded upwardly ramp elements serves simultaneously as additional safety devices against an unintentional sliding out of a bale during the street transportation, which after the end of the harvesting process in some circumstances remains in the pressing passage and was not ejected.

The conversion of the ramps from an operational position to a transporting position and vice versa is usually connected with a stopping of the agricultural machine and relatively expensive manual actions of the operator.

German document DE 295 17 425 U1 discloses a baling press with a further improved depositing device. The depositing device is composed of elements which are flapped inwardly relative to one another and connected with one another by special hinges. The hinges are components of an actuation device which is composed of a four-hinge coupling transmission, a transmission means which serves for driving the coupling transmission and also as a connecting rod, and an adjusting member which produces a pulling and/or pushing force.

With the actuating device, the depositing device can be adjusted without manual force application in a user-friendly way from an operator stand of the harvesting machine, from the operating and working position to the transporting position and vice versa. In its transporting position the elements of the depositing device are located in an approximately perpendicular position to the movement direction of the pressed bales and close the pressing passage opening of the baling press in the transporting position.

Despite the substantial facilitation of the work for the operator and not insignificant saving of the conversion time for the adjustment of the depositing device, the structural expenses and therefore the connected cost for the mechanical actuation device of the depositing device are relatively high.

SUMMARY OF THE INVENTION

Accordingly, it is an object of present invention to provide a depositing device of the above mentioned general type which, without high structural expenses, can be converted from an operator stand of the harvesting complex mechanically from a working and operating position to a transporting position and vice versa and which reliably closes in the transporting position the outlet opening of the pressing passage.

In keeping with these objects and with others which will become apparent hereinafter, one feature of present invention resides, briefly stated in a baling press, in which the conversion of the depositing device from the operating position to the transporting position and vice versa is performed by a closing element which is foldable approximately by 90° toward the pressing direction, and at least one element is bringable under the bottom of the pressing passage of the baling press in form of a drawer.

The inventive depositing device in its basic construction, as known, is composed of several plate shaped element which are provided with transporting rollers and connected with one another by a simple hinge, and in its unloaded working position are articulately connected through holding chains with a rear end portion of the pressing passage. For conversion of the depositing device from the working or operating position to a transporting position and vice versa, a closing element of the depositing device is folded inwardly by means of an actuating device, preferably a hydraulic working cylinder by approximately 90° to the pressing direction. The remaining elements are also brought by means of a working cylinder in a drawer-like manner under the bottom of the pressing passage of the baling press so that the closing element which is folded inwardly at 90° to the pressing direction closes the outlet opening of the pressing passage and in this way simultaneously serves for securing the closure of the outlet opening. In accordance with the present invention, the hydraulic circuit of the actuating device for the depositing device for the pressed harvesting product bales is provided with adjusting members which can be actuated by a pressure limiting valve and a check valve manually. The pressure limiting valve has the function of a safety device and turns off the actuating device when in the process of conversion of the depositing device to the corresponding operating or transporting position some disturbances occur, which can lead to damages or failing of the harvesting machine complex. During the increase of the working pressure in the hydraulic circuit of the actuating device, the pressure limiting valve interrupts the conversion process at a proper time so that the operator can determine the cause for the pressure increase and eliminate it. The increase of the hydraulic working pressure in the pressure limiting valve and the reaction of the valve is indicated preferably in the operators stand of the harvesting machine complex optically and acoustically, to provide at a proper time a manual control and to take certain measures for elimination of the cause for the deviation of the adjusted operational parameters.

With the non-return valve which is also arranged in the hydraulic circuit of the actuating device, the actuating device can be unlocked, and the closing element located in the transporting position is lowered so that the pressing passage is released, for example for control, maintenance or repair works with the turned on harvesting machine.

The conversion of the depositing device of the corresponding operating or transporting position, or in other words the turning in or turning out of the closing element to or from its approximately perpendicular transporting position and the adjustment of the remaining elements of the depositing device to their operating/transporting position is performed by hydraulic actuating devices formed as working cylinders. They are controlled on the operator's stand of the harvesting machine by the operator through the central hydraulic system of the harvesting machine complex. In the end of the operating or transporting position, the hydraulic working cylinder is locked. In this way it is guaranteed that the elements of the depositing device are reliably fixed and can operate in a disturbance-free operational mode.

For the arrangement of the non-turnable elements of the depositing device in their transporting position there are several variants. In accordance with a first embodiment the bottom of the pressing passage inside of the pulling-in region has the elements with a box-shaped hollow profile, in which the elements are pulled-in like drawers and received under the plane of the pressing passage bottom. The transporting rollers of the depositing device serve simultaneously as running rollers which support the moving in and moving out of the non turnable elements.

Instead of the box-shaped hollow profile, in accordance with a further embodiment of the present invention rail tracks are provided for receiving the transporting rollers under the plane of the pressing passage bottom. The non-folding-in elements of the depositing device can be moved with the transporting rollers to their transporting position.

In accordance with a further feature of present invention, guiding rollers are provided on the frame of the elements of the depositing device which are movable like drawers to their transporting position. They are supported on the pins which are arranged perpendicular to a frame plane so that they extend outwardly beyond the plane of the frame. In correspondence with the arrangement of the guiding rollers, in the pressing passage bottom individual spaced hollow profile carriers are arranged. They extend in a longitudinal axis of the pressing passage and receive the guiding rollers. In a drawer region of the elements, recesses are provided in the hollow profile carriers for the passage of the bearing pins.

Advantageously, guiding blocks are provided in the end positions of the drawer-like elements. In addition to the guiding drawers they receive portions of the frame and support the reliable hold and fixation of the elements of the depositing device in the operating and transporting positions.

Contrary to the known solutions for adjustment of the depositing device in or from a working position to a transporting position without manual action of the operator, the inventive solution has a relatively simple and functionally-reliable construction which can be produced with relatively simple means in a cost-favorable manner. In addition, the inventive depositing device satisfies all requirements for a reliable working and transporting operation.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
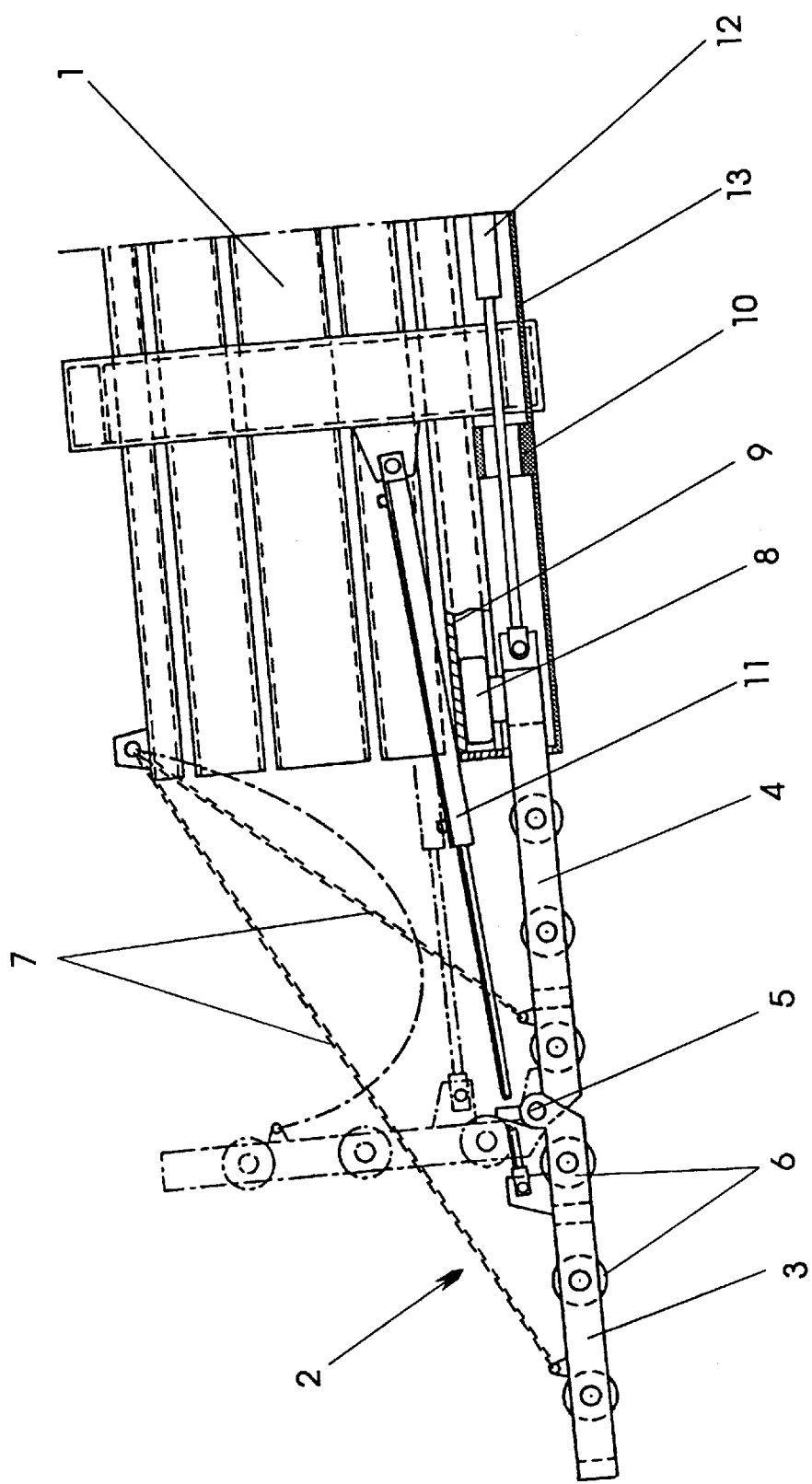
FIG. 1 is a view showing a rear end portion of a baling press with a depositing device located in a working or operating position, wherein a closing element turnable for the transporting position is shown in dash-dot lines.

In a baling press in accordance with the present invention a depositing device 2 is located at a rear end side of a pressing passage 1. The depositing device puts the bales 17, 18, which leave the pressing passage and are composed of compressed harvesting product, on a ground surface. The depositing device is composed of individual elements 3 and 4 provided with transporting rollers 6. They are connected with one another turnably in and out by a simple hinge 5 and suspended in their working position by holding chains 7 on a housing of the pressing passage 1. With the depositing device 2 located in its working position shown in FIG. 1, the total length of the harvesting machine complex is substantially increased.

In order to maintain the permissible dimensions of the vehicles and machines during the transportation of open streets and not to exceed them, the depositing device is formed and arranged so that for the street transportation it can be converted from a working and operating position to a transporting position. For shortening of the stoppage time and reducing the manual labor expense, corresponding measures are taken so that it can be performed in a mechanical way and carried out from the operator's stand of the harvesting machine complex.

Figure 2:
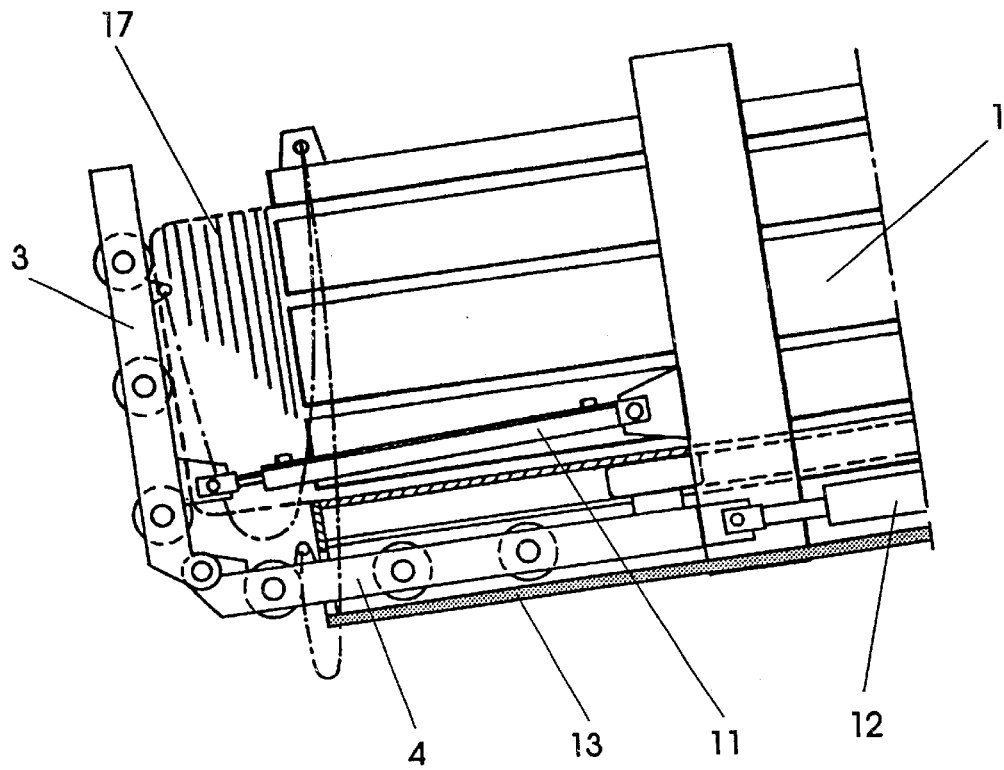
FIG. 2 is a view showing the depositing device of the present invention in the transporting positions
Figure 3:
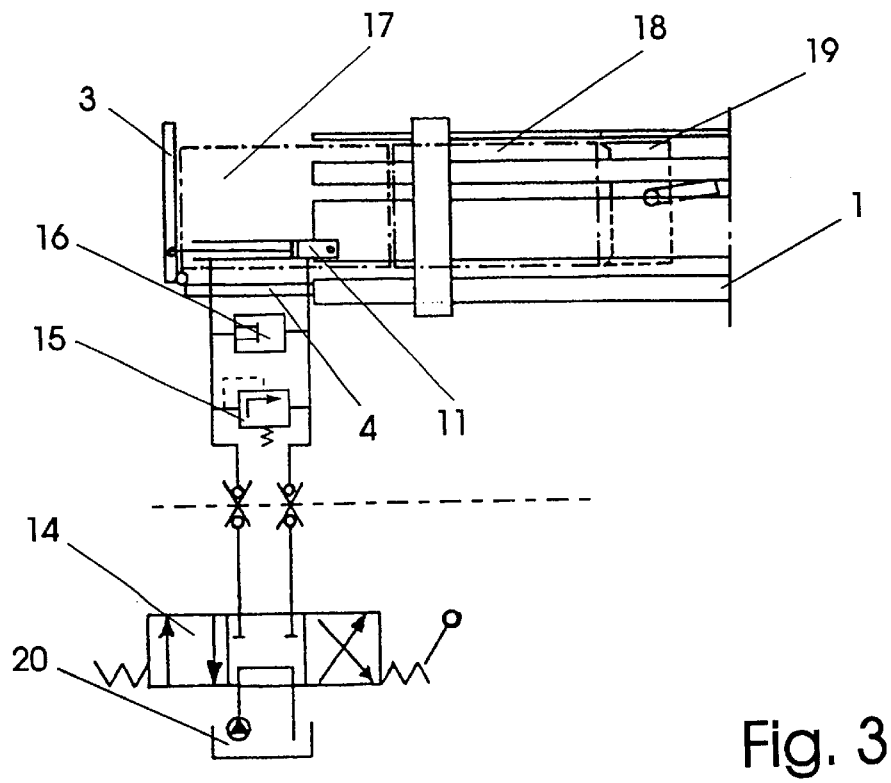
FIG. 3 is a view showing a connection of the actuating device for the closing element of the depositing device to a central hydraulic system of the harvesting machine complex.

For solving these problems, the closing element 3 of the depositing device 2 is turnable to an approximately perpendicular position by means of an actuating device 11 which is articulately connected to the frame of the element 3 and to the housing of the pressing passage and is connected with the central hydraulic system 20 of the harvesting machine complex. The non foldable-in element 4 is brought under the bottom 9 of the pressing passage 1 as a drawer by means of the actuating device 2 which is also formed as a hydraulic working cylinder. In this transporting position which is shown in FIG. 2, the foldable-in element 3 closes in an approximately perpendicular position the outlet opening of the pressing passage 1. Simultaneously it serves as a safety element, with which the sliding out of the bales 17, 18 eventually remaining in the pressing passage 1 can be reliably prevented during the street transportation.

Figure 4:
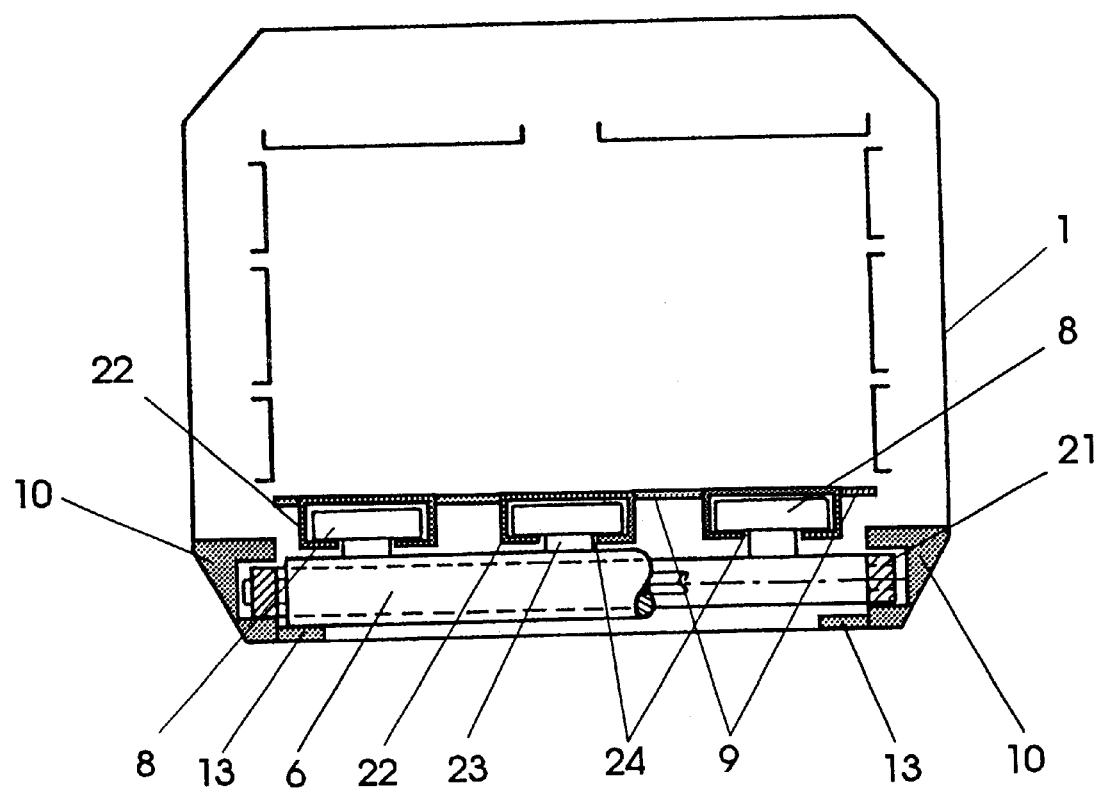
FIG. 4 is a view showing a pressing passage of the baling press with a part of the depositing device located in the transporting position, in a schematic representation.

As can be further seen from FIGS. 1 and 4, the bottom 9 of the pressing passage 1 has hollow profile carriers 22. They extend in the direction of the longitudinal axis of the pressing passage and are spaced from one another. The hollow profile carriers 22 serve for receiving of guiding rollers 8. The guiding rollers support the drawer-like bringing of the element 4 during conversion of the depositing device 2 to the transporting position. The guiding rollers 8 which produce the structural connection between the bottom 9 of the pressing passage 1 of the element 4 of the depositing device 2 are arranged rotatably on bearing pins 23 shown in FIG. 4. The bearing pins 23 are arranged on the frame 21 of the element 4 and project outwardly beyond the horizontal plane of the element 4. In the insertion region of the element 1 under the bottom 9 of the pressing passage 1, the hollow profile carriers 2 are provided with a recess 24 for the passage of the bearing pins 23.

Rail tracks 13 are provided under the pressing passage for the transporting device to the corresponding operating or transporting position. They serve simultaneously as running rollers and facilitate in this way the conversion process and the reliable arrangement of the element 4 in its transporting position. Further guiding blocks 10 are provided and arranged so that portions of the frame 21 of the element 4 are additionally fixed in the guiding blocks in the end of the operating or transporting positions. The work cylinders 11 and 12 which operate for bringing the depositing device 2 to its operating or transporting position are connected in a known manner through a directional valve 14 with a central hydraulic system 20 of the of the harvesting machine complex. Additionally a pressure limiting valve 15 and non-return valve 16 are provided in the hydraulic circuit of the working cylinder 11.

The pressure limiting valve 15 serves as a safety device. It turns the working cylinder when working pressures occur which are higher than a maximum permissible value, to avoid damage during conversion of the depositing device 2.

With the non-return valve, the hydraulic working cylinder 11 can be unlocked and the element 3 located in the transporting position can be turned back. Thereby the outlet opening of the pressuring channel 11 can be released and made accessible, for example for repair or control works.

It will be understood that each of the elements described above, or two or more together, may also find a useful application in other types of constructions differing from the types described above.

While the invention has been illustrated and described as embodied in bailing press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A baling press for agricultural harvesting products comprising means forming a pressing passage having a housing and an opening defining a pressing direction and a depositing device which is moveable between an operating position and a transporting position and is operative for depositing pressed bales on a ground, said depositing device including a plurality of articulately connected elements; said plurality of articulately connected elements comprising an element arranged to close said opening of said pressing passage in the transporting position; and a further element movable into a position under a bottom of said pressing passage; said element being connected to said further element; wherein in the transporting position said element is foldable with respect to the further element by approximately 90° and is actuated by said further element to close said opening of said pressing passage.

2. A baling press as defined in claim 1, wherein said bottom of said pressing passage has a box profile and forms a storage chamber for storing said further element in the transporting position.

3. A baling press as defined in claim 1, wherein said depositing device is formed as a roller ramp and is provided with transporting rollers formed as running rollers for bringing said depositing device from the operations position to the transporting position.

4. A baling press as defined in claim 1, wherein said further element comprises a frame having guiding rollers mounted thereto; and wherein said bottom of said pressing passage has hollow profile carriers mounted thereto for receiving said guiding rollers.

5. A baling press as defined in claim 1, wherein said further element comprises a frame and a plurality of transporting rollers mounted to said frame; and wherein said bottom of said pressing passage has rail tracks for receiving said transporting rollers.

6. A baling press for agricultural harvesting products comprising means forming a pressing passage having a housing and an opening defining a pressing direction; a depositing device which is moveable between an operating position and a transporting position and is operative for depositing pressed bales on a ground, said depositing device including a plurality of articulately connected elements, said plurality of articulately connected elements comprising an element arranged to close said opening of said pressing passage in the transporting position, and a further element movable into a position under a bottom of said pressing passage, said element being connected and foldable with respect to said further element by approximately 90°; an actuating device having a hydraulic circuit for moving and blocking said depositing device in transporting position, said hydraulic device including adjusting members, wherein one of said adjusting members serves as a safety device and another of said adjusting members lifts the blocking function of said actuating device, and wherein by lowering of a corresponding one of said adjusting members said depositing device opens the opening of the pressing passage and moves the depositing device from the transporting position to the operating position.

7. A baling press as defined in claim 6; and further comprising a directional valve adapted to connect said actuating device of said depositing device with a central hydraulic system of an agricultural machine complex; said one of said adjusting members being a non-return valve provided in said hydraulic circuit of said actuating device, said non-return valve capable of being operated manually to open said opening of said pressing passage; and said another of said adjusting members being a pressure limiting valve connected to said hydraulic circuit to serve as an overload protection.

8. A baling press as defined in claim 7; and further comprising means for optically and acoustically indicating a hydraulic working pressure and a response of said pressure limiting valve serving as the overload protection in an operating condition of the agricultural machine complex.

* * * * *